United States Patent
Gunter et al.

(10) Patent No.: US 6,751,728 B1
(45) Date of Patent: Jun. 15, 2004

(54) SYSTEM AND METHOD OF TRANSMITTING ENCRYPTED PACKETS THROUGH A NETWORK ACCESS POINT

(75) Inventors: David V. Gunter, Redmond, WA (US); Leeon Moshe Shachaf, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/334,349

(22) Filed: Jun. 16, 1999

(51) Int. Cl.[7] .............................. H04L 9/00; H04L 9/32; G06F 11/30; G06F 12/14; G06F 15/16
(52) U.S. Cl. ....................... 713/153; 713/162; 713/201; 709/250; 709/245
(58) Field of Search ................................ 713/153, 162; 713/201; 709/250, 245

(56) References Cited

U.S. PATENT DOCUMENTS

| | | | | |
|---|---|---|---|---|
| 5,548,649 A | * | 8/1996 | Jacobson .................... | 713/153 |
| 5,793,763 A | * | 8/1998 | Mayes et al. ............... | 370/389 |
| 5,845,267 A | * | 12/1998 | Ronen ........................ | 705/40 |
| 6,061,794 A | * | 5/2000 | Angelo et al. ............. | 713/200 |
| 6,154,839 A | * | 11/2000 | Arrow et al. ............... | 713/154 |
| 6,321,336 B1 | * | 11/2001 | Applegate et al. .......... | 713/201 |

OTHER PUBLICATIONS

K. Egevang & P. Frances, *RFC 1631: The IP Network Address Translator (NAT)*, May 1994, Available from http://www-bib.fh-bielefeld.de/epub/doc/idoc/rfc/rfc1600-1699/rfc1631.html.

M. St. Johns, *RFC 931: Authentication Server*, Jan. 1984, Available from http://www-bib.ph-bielefeld.de/epub/doc/idoc/rfc/rfc0900-0999/rfc931.html.

R. Rivest, *RFC 1321: The MD5 Message Digest Algorithm*, Apr. 1992, Available from http://www-bib.fh-bielefeld.de/epub/doc/idoc/rfc/rfc1300-1399/rfc1321.html.

Burton S. Kaliski Jr, *An Overview of the PKCS Standards: An RSA Laboratories Technical Note*, Nov. 1, 1993, Available from http://www.areane.com/doc/rsa/pkcs/overview.htm.

\* cited by examiner

*Primary Examiner*—Gilberto Barrón
*Assistant Examiner*—Cas Stulberger
(74) *Attorney, Agent, or Firm*—Leydig, Voit & Mayer, Ltd.

(57) ABSTRACT

A method and system for network communication efficiently transmits encrypted packets from a sending host on an external network to a receiving host on an intranet through a network access point (NAP) of the intranet. A packet to be sent by the sending host on the external network is constructed with the external network address of the NAP as the destination address of the packet. The intranet address of the receiving host is also included in the packet in the non-encrypted form and is used in the calculation of the cryptographic hash or the like that is included in the packet for authentication purposes. The encrypted packet is then routed to the NAP through the external network. When the NAP receives the packet, it strips the intranet address of the receiving host from the packet and uses that address to replace the original destination address in the packet. The NAP then forwards the modified packet to the receiving host. Because the NAP does not have to decrypt the packet, encrypted packets can quickly go through the NAP. When receiving host receives the modified packet, it decrypts the packet and authenticates it. Because the destination address in the modified packet is the same address used in calculating the cryptographic hash of the packet, the packet should be deemed valid by the receiving host.

14 Claims, 6 Drawing Sheets

SYSTEM AND METHOD OF TRANSMITTING ENCRYPTED PACKETS THROUGH A NETWORK ACCESS POINT

TECHNICAL FIELD OF THE INVENTION

This invention relates generally to network communication and, more particularly, to the communication between a computer on an intranet with another computer on an external network through a network access point of the intranet.

BACKGROUND OF THE INVENTION

Computers in an organization are often linked together to form a private network so that the computers can communicate with each other and share resources. Such an internal computer network within the control of an organization is commonly referred to as an "intranet." Many intranets are composed of local area networks, although the intranets of some large organizations have grown very large and require the level of sophistication found in the Internet.

For security reasons, an intranet is typically connected to an external network, such as the Internet, through one or more network access points. A network access point (NAP) is generally a server that exerts access control over the incoming communication flow from the external network. To that end, communication packets from a host on the external network for a host on the intranet are routed to go through the NAP, which then decides whether to forward the packets to their intended recipient, i.e., the host on the intranet. There are different ways a NAP can exercise access control. For example, a NAP may be a firewall that decides whether to forward the packets based on a pre-set packet filtering rules or functions as a proxy to apply application-level session-based access control.

One of the tasks often performed by a NAP is address translation. Many intranets have their own private addressing spaces, and the intranet addresses of the hosts on an intranet are often not usable by routers on the external network for routing packets. As a result, the private intranet address cannot be used as a destination address for sending communication packets from an external host across the external network. For this reason, the communication packets have to be sent to the NAP sitting at the border of the private intranet and the external network. The NAP then performs address translation on the packets to provide the intranet address of the receiving host so that the packets can be properly forwarded.

The address translation by a NAP can cause problems when the incoming packets are encrypted. To maintain the confidentiality of communication, many hosts encrypt the data in the communication packets. In order to prevent malicious security attacks by decrypting and modifying the data, many network protocols use an encryption and cryptographic checksum mechanism to guarantee the integrity of the data. While the specifics of the security check differ for each protocol, most protocols require the calculation of a cryptographic hash value using the source address, destination address, and data of the packet as input of the hash function. The inclusion of the destination address in the calculation of the hash value enables the detection of a security attack that alters the destination address. The communication data and the hash value are then encrypted and put in the packet together with the source and destination addresses for the packet.

When the NAP receives such an encrypted packet intended for a host on its intranet, it cannot perform the address translation by simply replacing the original destination address with the intranet address of the receiving host. This is because the original destination address is used to generate the hash value in the packet. When the receiving host receives the modified packet, it decrypts the encrypted portion and authenticates the packet by calculating another hash value based on the addresses and data in the received packet, and comparing this hash value with the hash value included in the packet. Because the destination address of the received packet has been modified by the NAP, the two hash values will not match, and the receiving host will discard the packets as being invalid.

To prevent the packets from failing the authentication check, the NAP has to be able to modify the hash value in the packet to reflect the change to the destination address. This approach, however, presents other problems. First of all, the hash value in the packet is encrypted, and the NAP simply may not know how to undo the encryption of the packet and therefore cannot modify the hash value. Moreover, even if the NAP somehow knows how to decrypt the packet, the modification of the packet is very time consuming. To modify the packet, the NAP has to decrypt the packet, change the destination address, calculate the new hash value based on the modified destination address, and then re-encrypt the data and the new hash value. This process is very calculation-intensive. As a result, the speed at which encrypted packets can pass through the NAP can be prohibitively slow for many types of communications. For example, sending live video signals through the Internet requires the transmission of a data stream at a relatively high rate. Performing the "address translation" on encrypted packets as described above can cause unacceptable delay of data transmission for such video applications.

SUMMARY OF THE INVENTION

In view of the foregoing, the present invention provides a method and system for efficiently transmitting encrypted packets between a sending host on an external network and a receiving host on an intranet through a network access point (NAP) of the intranet. An encrypted packet to be sent by the sending host on the external network is formed with the external network address of the NAP as the destination address of the packet. The intranet address of the receiving host is also included in the packet in the non-encrypted form. The intranet address of the receiving host is also used in places where the packet destination address would normally be used for security checking purposes, such as generating a cryptographic hash, under the network protocol used. The packet is then routed to the NAP through the external network.

When the NAP receives the encrypted packet, it strips the field containing the intranet address of the receiving host and substitutes the original destination address in the packet with the intranet address of the receiving host. The NAP then forwards the modified packet to the receiving host. Because the NAP does not have to decrypt the packet, encrypted packets can go through the NAP at a high rate. When the receiving host receives the modified packet, it decrypts the packet and authenticates it. Because the destination address in the modified packet is the same intranet address of the receiving host used in calculating the cryptographic hash or the like, the packet should pass the security check by the receiving host.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
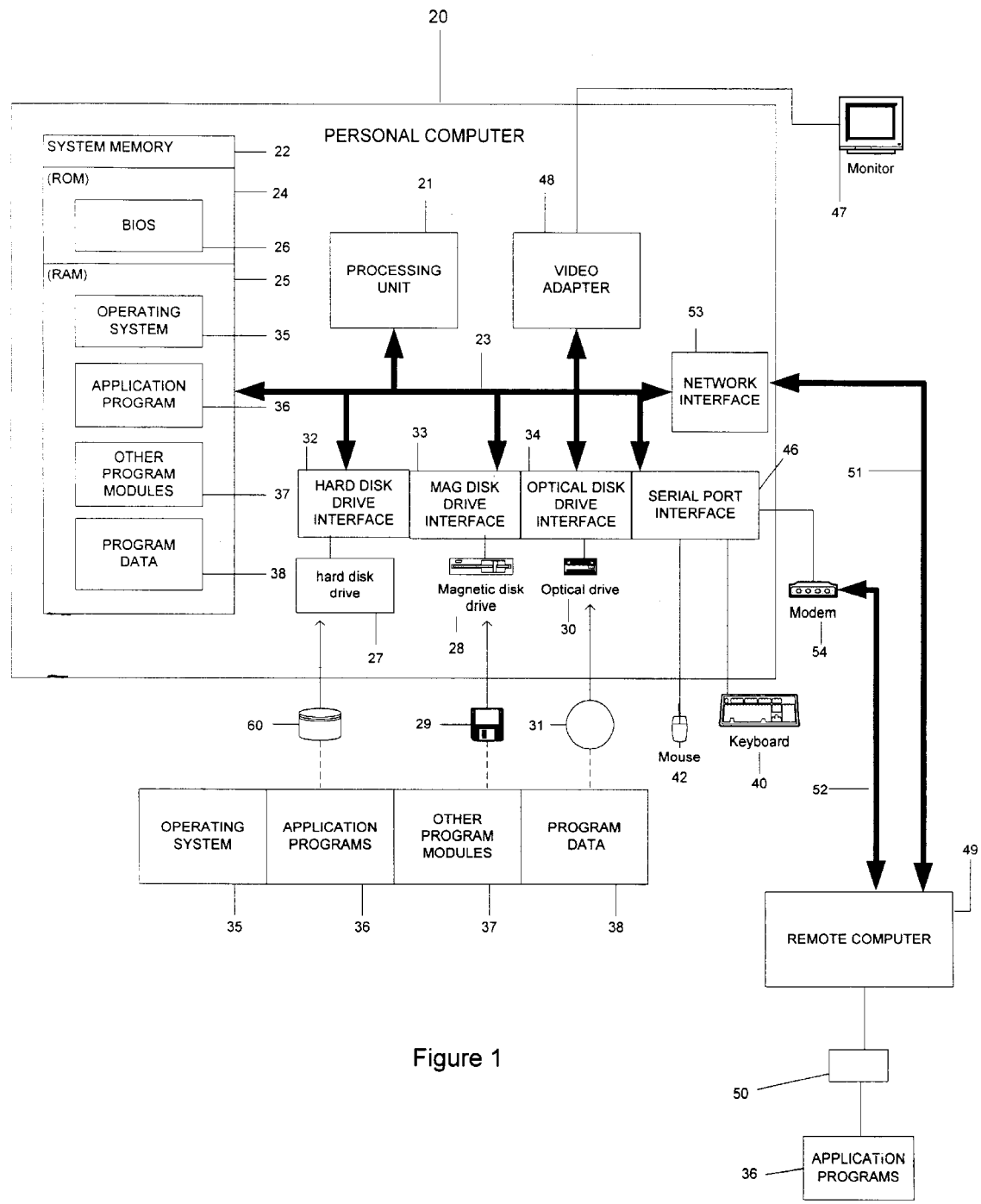
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
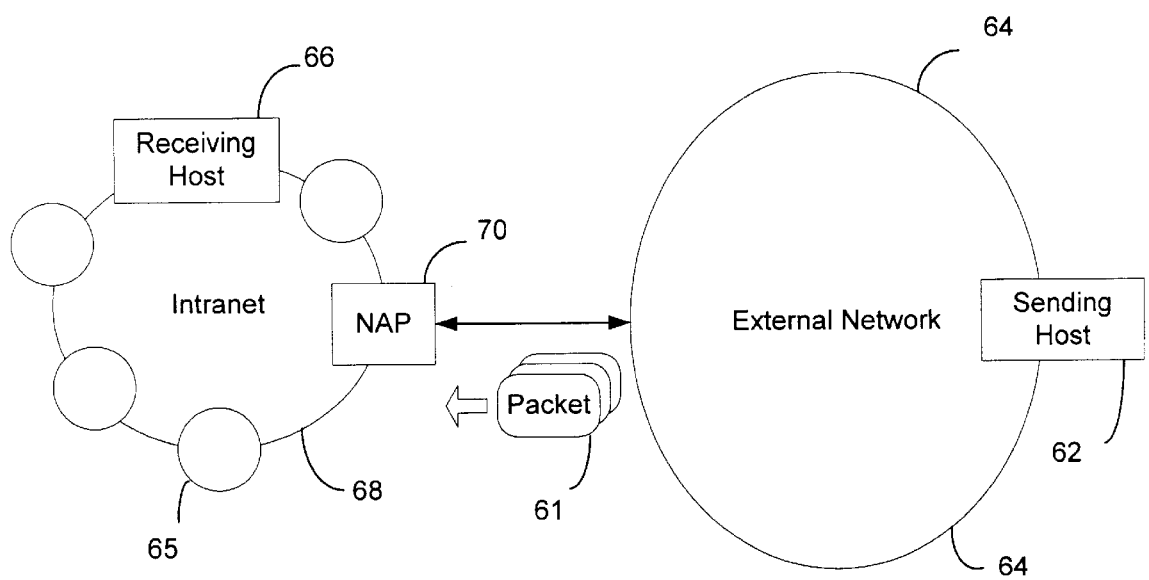
FIG. 2 is a schematic diagram showing a host on an external network communicating with a host on an intranet through a network access point (NAP) of the intranet.

Referring now to FIG. 2, the present invention is directed to an efficient way to transmit encrypted communication packets 61 from a sending host 62 on an external network 64, such as the Internet, to a receiving host 66 on an intranet 68 through a network access point (NAP) 70 of the intranet. As illustrated in FIG. 2, the intranet 68 may include a plurality of computers 65 linked together to form a network using one or more of the known network architectures and protocols. For instance, the intranet 68 may be a local area network (LAN) based on the Ethernet or token ring architecture, or a larger network that includes a plurality subnets. As is typical for many internal networks belonging to various organizations, access to the hosts and resources on an intranet by a host outside the intranet is often restricted and controlled. For various security and network connection reasons, the intranet is connected to external networks through one or more network access points. The NAP 70 may be, for example, a firewall that controls the flow of communication from the outside world by means of packet filtering or application-level gateways.

A host on the external network 64 communicates with a host computer on the intranet 68 by transmitting packets across the external network 64 and through the NAP 70 in accordance with a network protocol. For example, in a preferred embodiment, the external network 64 is the Internet, and the source address and destination addresses of the packets 61 are in the format of the Internet Protocol (IP), and the packets are routed across the Internet to the intranet 68 according to the TCP/IP protocol.

Typically, the proper routing of the communication packets requires the use of a destination address for the packets that is public and meaningful to the various routers in the external network. To that end, the host on the external network 64 has to know the public network address of the NAP 70. An intranet, however, typically has its own private naming space for the hosts and resources on the intranet, and the private intranet address of a host on the intranet is generally not recognized by the external network to which the intranet is connected. As a result, the intranet address of the host that is the intended recipient of the packets cannot be directly used as the destination address for the packets because it cannot be recognized by the routers in the external network. On the other hand, if the packets are sent without identifying the receiving host, such as by its intranet address, the packets still may not be properly delivered to the receiving host even if they somehow arrive at the intranet of the receiving host.

Because of the use of a private address space by the intranet 68, the NAP 70 is often required to perform some type of network address translation on the incoming packets from the external network. As described above, the address translation can be problematic when the communication packets 61 coming to the NAP 70 are encrypted for security reasons. Simply modifying the destination address of a packet without making corresponding changes to the encrypted portion of the packet may render the packet invalid, i.e., the packet would fail the authentication by the receiving host 66. Even if the NAP 70 can somehow decrypt the packets and modify them, the necessary decryption and re-encryption can be prohibitively time consuming for many applications, such as digital video applications, that require data streams to be transmitted at a high rate.

The present invention provides an effective solution to these problems that can be implemented easily without having to deal with the underlying encryption details of the packets. Specifically, in accordance with the invention, packet decryption by the NAP 70 is avoided altogether by including both the public network address of the NAP 70 and the private network address of the receiving host 68 in the non-encrypted portion of the encrypted packet. The intranet address of the receiving host 66 is also used in places where the packet destination address would conventionally be used to generate a security checksum or the like, such as a cryptographic hash, that is included in the encrypted portion for security checking purposes. The public address of the NAP 70 allows the packet to be properly routed across the external network 64 to the NAP 70, and the intranet address of the receiving host 66 is used by the NAP to forward the packet to the receiving host. The only operation the NAP has to do on the encrypted packet is to strip the field containing the intranet address of the receiving host from the packet and use that address to replace the original destination address of the packet, which is the external network address of the NAP. This simple operation of "address translation" enables the NAP to process encrypted packets quickly to achieve a high throughput.

By way of example, the invention will be illustrated using an embodiment in which the external network is the Internet, and the intranet is a local area network (LAN). It will be appreciated, however, that the invention is equally applicable to communications between hosts on other types of external networks and intranets through a NAP.

Figure 3:
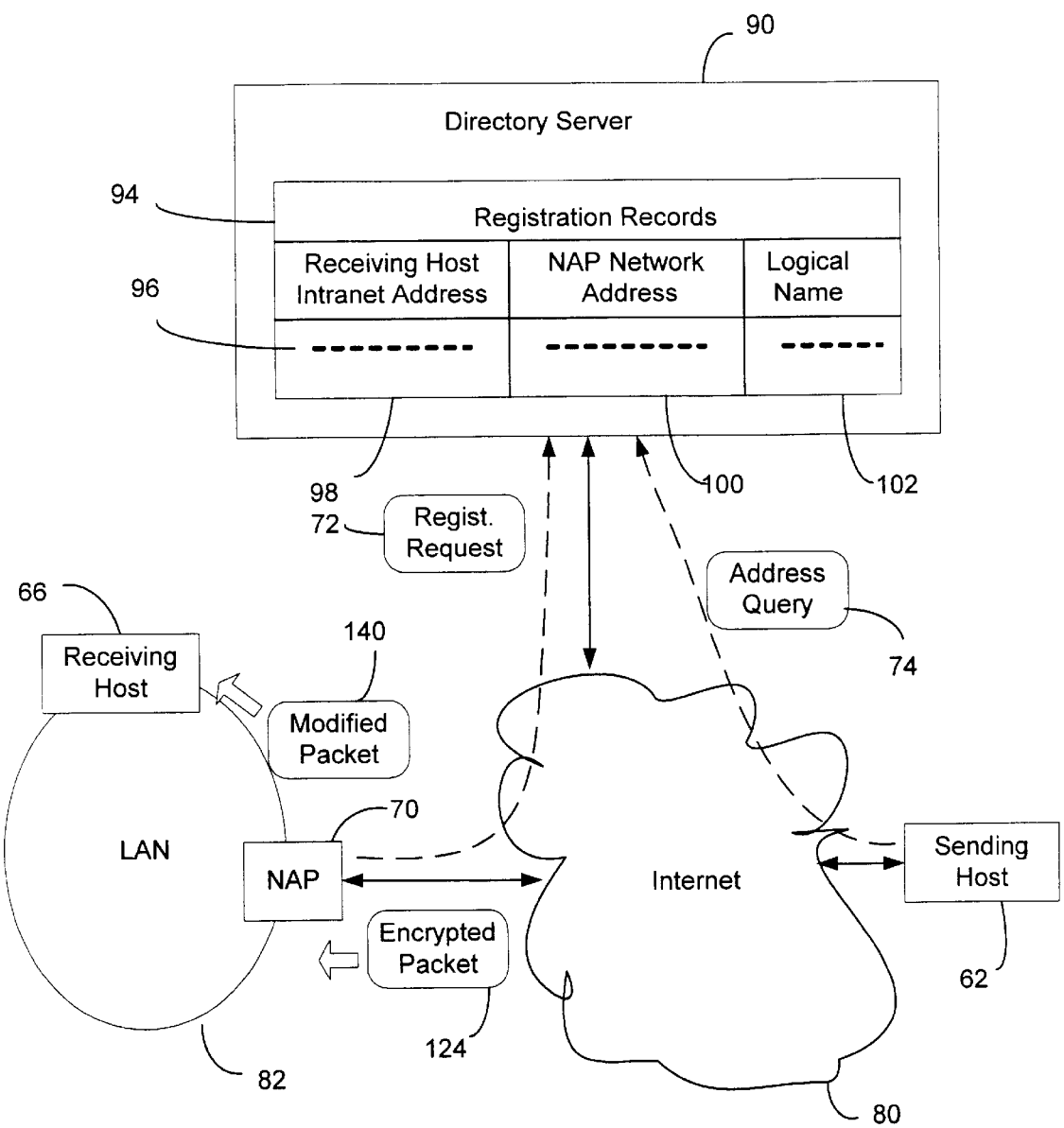
FIG. 3 is a schematic diagram of an embodiment of the invention having a host on the Internet sending packets to a host on a LAN.

Turning now to FIG. 3, in accordance with an aspect of the invention, to enable the hosts on the Internet 80 to find out about the addresses of the NAP 70 and the receiving host 66, the receiving host first registers itself with a directory server 90 or the like on the Internet that is visible from the Internet beyond the LAN 82. In the illustrated embodiment of FIG. 3, the registration is through the help of the NAP 70. The receiving host 66 first notifies the NAP 70 of its LAN 82 that it wants to register itself so that it can receive encrypted data from the Internet. When the NAP 70 receives the request from the receiving host 66, it sends a registration request 72 to the directory server 90 on behalf of the receiving host. In response to the registration request, the directory server 90 creates a record 96 for the receiving host. As shown in FIG. 3, the record 96 contains the intranet address 98 of the receiving host 66, the Internet address 100 of the NAP 70, and a logical name 102, such as a Domain Name System (DNS) name, of the receiving host.

After the receiving host 66 has registered with the directory server 90, other hosts on the Internet 80 can learn how to contact it by accessing the directory server. A host on the Internet may initially know only the logical name of the receiving host. In order to initiate an encrypted communication with the receiving host 66 through the NAP 70, the sending host 62 sends a query 74 to the public directory server 90 on the Internet 80 to look up the name of the receiving host 66 in the records 94 maintained by the directory server. In response, the directory server returns the network address of the NAP 70 of the LAN 82, and the intranet address of the receiving host 66.

Having obtained the Internet address of the NAP and the intranet address of the receiving host, the sending host 62 constructs communication packets destined for the receiving host 66. The communication packets are constructed using the intranet address of the receiving host according to a network protocol chosen by the sending host, with a simple modification in accordance with the invention as described in greater detail below. It will be appreciated that the specific network protocol used and its security features are not critical to the invention. Nevertheless, for purposes of illustration, in an embodiment described below, it is assumed that the security check in the selected transmission protocol is by means of a cryptographic hash.

Figure 4:
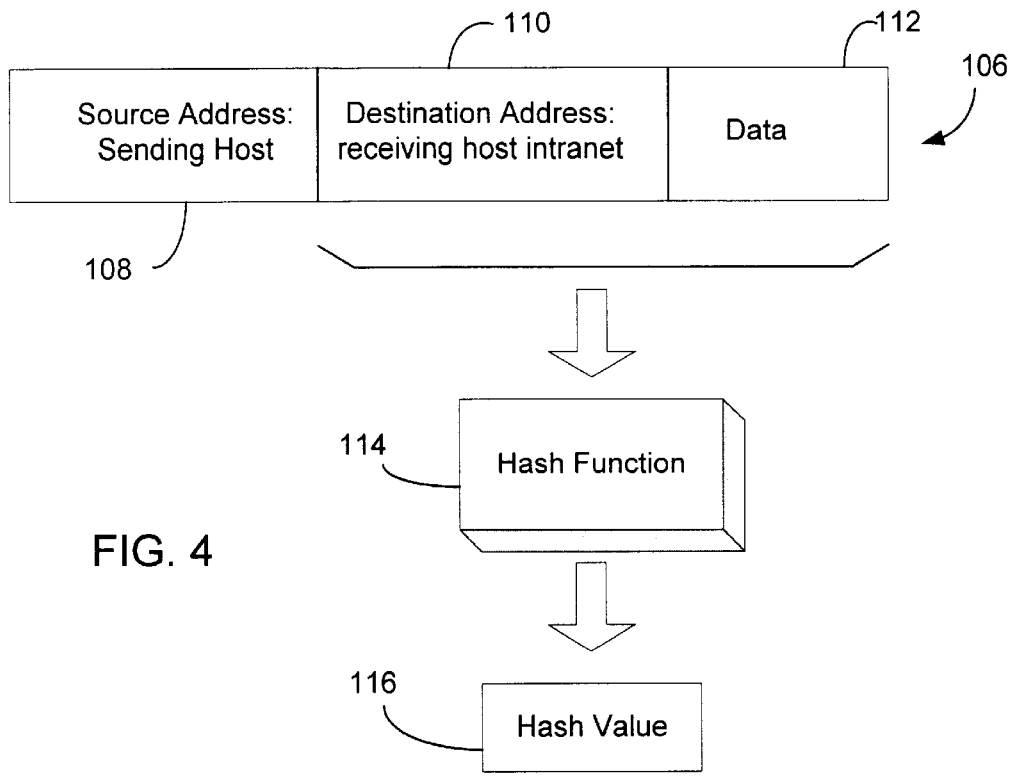
FIG. 4 is a schematic diagram of a data structure from which a packet is constructed.

Referring to FIG. 4, to form a communication packet, the sending host 62 first creates a data structure 106 that includes a source address field 108, a destination address field 110, and a data portion 112 containing the actual data for the packet. The source address field 108 in the data structure 106 contains the Internet address of the sending host 62. The destination address field 110 contains the intranet address of the receiving host 66. It will be appreciated that because the intranet address of the receiving host is not recognized by the routers in the Internet, the packet cannot be transmitted through the internet based on such destination address.

Figure 5:
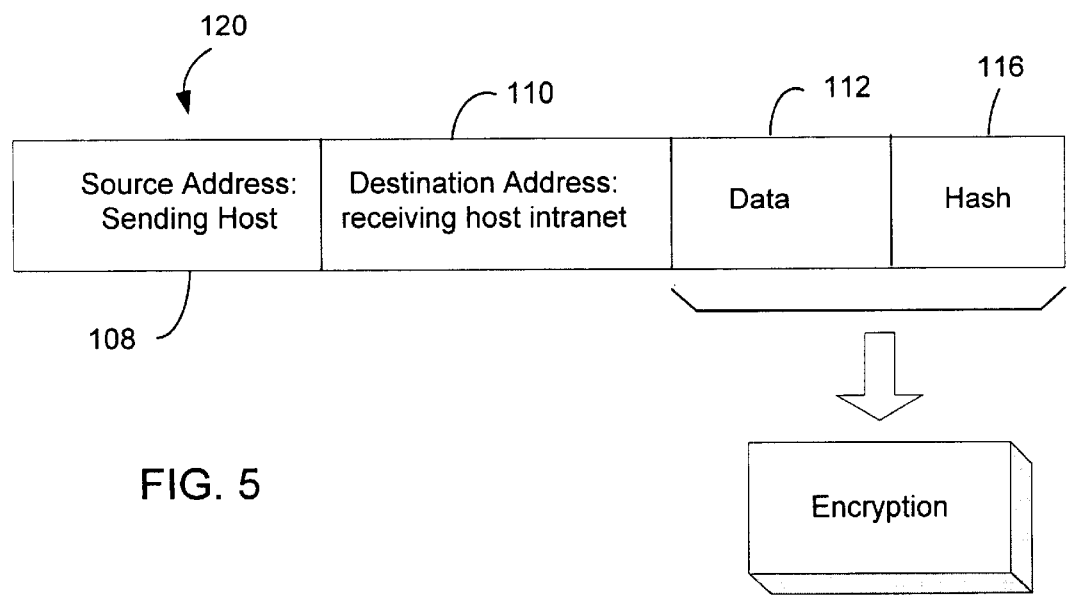
FIG. 5 is a schematic diagram of a data structure derived from the data structure of FIG. 4.

The data structure 106 in FIG. 4 is then used as the input of a hash function 114, such as the MD4 or MD5 cryptographic hash algorithm, to create a cryptographic hash 116. Generally, the cryptographic hash 116 is a numeric value based on the contents of the entire data structure. Any modification of the input data used to calculate the cryptographic hash will result in a different cryptographic hash value. In the present example, the cryptographic hash is calculated based on the source address, the intranet address of the receiving host, and the data of the packet. If any of them is altered, the hash value will be changed. The cryptographic hash value 116 is then attached to the data structure 106 of FIG. 4 to form the data structure 120 shown in FIG. 5. The data portion 112 and the cryptographic hash 116 are then encrypted using a known encryption mechanism. For example, the encryption may use a single key known to both the sending and receiving hosts, or the public key-private key scheme. The resultant data structure 122 is shown in FIG. 6, in which the encrypted portion is shown as shaded.

Figure 6:
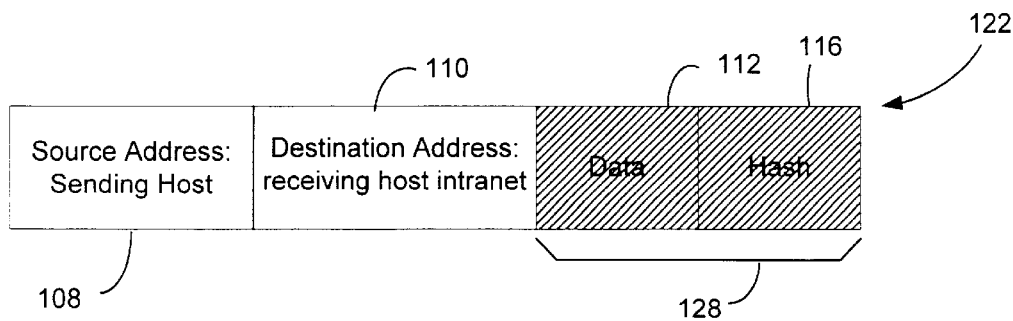
FIG. 6 is a schematic diagram of a data structure with an encrypted portion derived from the data structure of FIG. 5.
Figure 7:
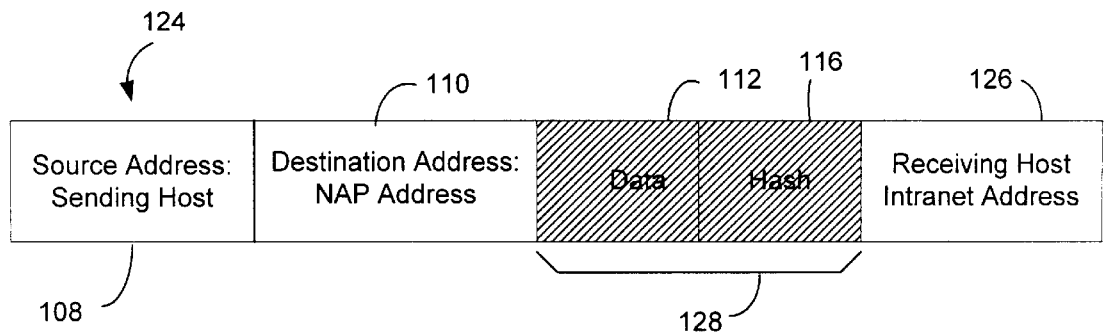
FIG. 7 is a packet constructed by modifying the data structure of FIG. 6 in accordance with an embodiment of the invention.

The sending host 62 then constructs a packet by modifying the data structure 122 of FIG. 6. The modification includes (1) replacing the destination address, which is initially the intranet address of the receiving host, with the Internet address of the NAP of the intranet on which the receiving host resides, and (2) appending the intranet address of the receiving host to the end of the encrypted portion 128 of the data structure 122. The resultant packet 124 is shown in FIG. 7. It will be appreciated that appending the intranet address 126 of the receiving host, which is typically 32-bit long, should have minimal effect on the overall length of the communication packet 124.

Referring again to FIG. 3, the sending host 62 transmits the packet 124 with encrypted data through the Internet 80. Because the destination address of the packet 124 is the Internet address of the NAP 70 of the LAN 82 of the receiving host 66, the packet is routed across the Internet to the NAP. When the NAP 70 receives the packet 124, it strips the field 126 containing the intranet address of the receiving host 66 from the received packet 124, and replaces the NAP address in the destination address field 110 with the intranet address of the receiving host. This modification puts the packet back in the form shown in FIG. 6. Because this "address translation" by the NAP involves only stripping a field and replacing another field, the time required for the NAP to process a packet is much less than that would be required if the NAP had to decrypt and/or re-encrypt the packet.

Besides modifying the received packet 124 for "address translation," the NAP 70 can also perform some form of access control on the received packet. For instance, if the NAP is a firewall, it may screen the incoming packets based on predefined rules or perform some application-level session-based access control. If the received packet meets the access control criteria, the NAP modifies it in the way described above and forwards the modified packet 140 to the receiving host 66 on its LAN 82.

When the receiving host 66 receives the modified packet 140 forwarded by the NAP 70, it decrypts the encrypted portion of the packet to obtain the data 112 and the cryptographic hash 116. If desired, the receiving host 66 may authenticate the received packet 140 to ensure the integrity of the packet. For the packet shown in FIG. 7 that uses a cryptographic hash, the receiving host calculates a hash value based on the addresses and data of the received packet 140. It is to be noted that the destination address field of the received packet 140 contains the receiving host's own intranet address. The receiving host 66 then compares the hash value it has calculated with the hash value decrypted from the received packet. If they match, the packet is authenticated, i.e., neither the addresses nor the data have been tampered with. It will be appreciated that because the hash value 116 included in the packet is calculated using the intranet address of the receiving host, it should match the hash value calculated by the receiving host if the packet has not been maliciously altered.

Figure 8:
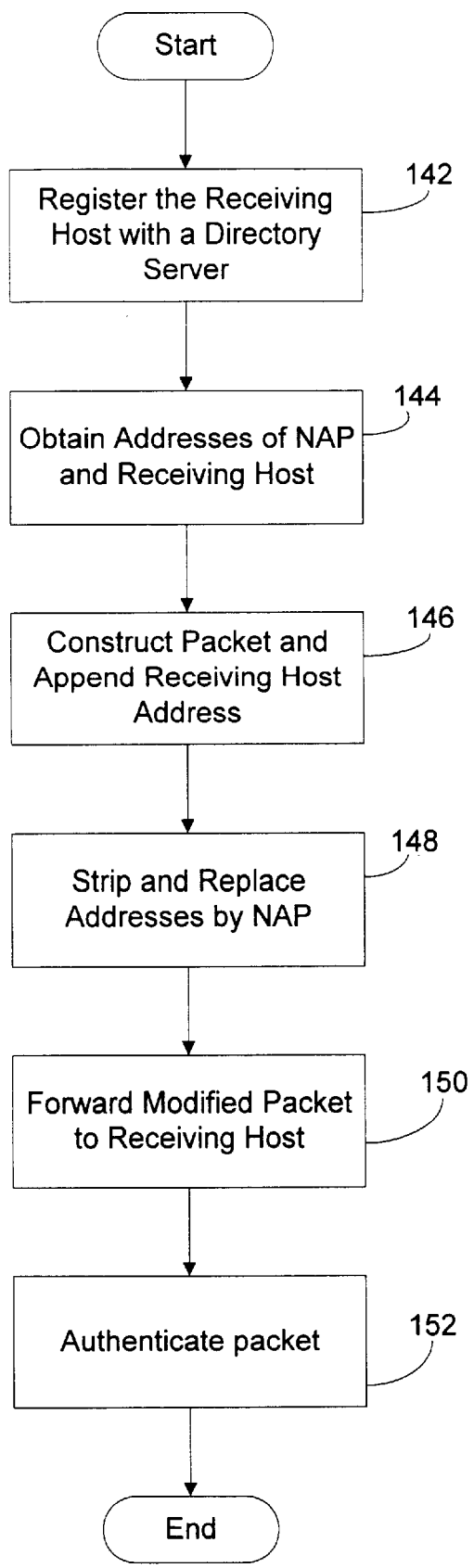
FIG. 8 is a flow chart showing a process of communication between a host on an external network with a host on an intranet by sending encrypted packets through a NAP of the intranet.

The method for transmitting encrypted communication packets through the NAP of an intranet as described above is summarized in FIG. 8. To enable hosts on the external network to learn how to reach it, the receiving host registers itself with a directory server accessible from the external network (step 142). When a sending host on the external network intends to communicate with the receiving host, it queries the directory server to obtain the intranet address of the receiving host and the public network address of the NAP of the receiving host's intranet (step 144). The sending host constructs a packet to include the NAP address as the destination address and appends the intranet address of the receiving host to the packet (step 146). If the packet is encrypted and a security checksum, such as a cryptographic hash, is used for validating the packet, it is the intranet address of the receiving host, rather than the external network address of the NAP, that is used in calculating the security checksum.

When the NAP receives the packet, it strips the appended intranet address from the packet and uses that address to replace the destination address of the received packet (step 148). The NAP then forwards the modified packet to the receiving host according to its intranet address (step 150). When the receiving host receives the modified packet, it decrypts the packet and authenticates it(step 152).

In view of the foregoing, it can be seen that the present invention provides a very simple-to-implement and elegant solution to the problems associated with passing encrypted data packets through an intranet NAP. Passing packets according to the invention requires a minimal amount of changes to the packets, and the changes can be made easily regardless of which encryption method and security check are used to construct the packets. One of the important advantages of the invention is that the NAP can perform the address translation on the packets quickly, without having to be concerned with the encrypted portion of the packets. As a result, the invention can be advantageously used to provide high packet throughput that is required for many high-speed data stream applications.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for operating a network access point (NAP) of an intranet for performing the steps comprising:

receiving from an external network a packet having an encrypted portion, a destination address field containing an external network address of the network access point, and a third field containing an intranet address of a receiving host on the intranet;

stripping said third field containing the intranet address of the receiving host from the packet;

inserting the intranet address of the receiving host taken from said third field into the destination address field; and forwarding the packet to the receiving host on the intranet.

2. A computer-readable medium as in claim 1, having further computer-executable instructions for performing the step of determining whether the packet is to be forwarded to the receiving host.

3. A computer-readable medium as in claim 1, wherein the external network is the Internet.

4. A computer-readable medium having stored thereon a computer executable method for forming for a network communication packet, comprising:

creating a first data field by storing a source network address for the packet;

creating a second data field by storing a network address for a network access point (NAP) for an intranet;

creating a third data field by storing encrypted information; and creating a fourth data field by storing an intranet address of a receiving host on the intranet of the NAP.

5. A computer-readable medium as in claim 4, wherein creating the data in the third data field represents an encryption of data including a cryptographic hash based on the intranet address of the receiving host.

6. A computer-readable medium as in claim 4, wherein creating the second data field of the NAP and the sending host are in an Internet format.

7. A method of communication between a sending host on an external network and a receiving host on an intranet through a network access point (NAP) of the intranet, comprising the steps of:

constructing, by the sending host, a packet having a source address field, a destination address field containing a network address of the NAP, an encrypted portion, and a recipient address field containing an intranet address of the receiving host;

transmitting, by the sending host, the packet to the external network;

receiving the packet by the NAP;

modifying the packet by the NAP, including stripping the recipient address field from the packet and replacing the network address of the NAP in the destination field with the intranet address of the receiving host; and forwarding, by the NAP, the modified packet to the receiving host.

8. A method as in claim 7, wherein the step of constructing the packet includes generating a cryptographic hash based on the intranet address of the receiving host.

9. A method as in claim 8, wherein the step of constructing the packet further includes encrypting communication data and the cryptographic hash to form the encrypted portion of the packet.

10. A method as in claim 8, further including the step of determining by the NAP whether to pass the packet to the receiving host.

11. A method as in claim 7, further including the step of decrypting the encrypted portion of the modified packet by the receiving host.

12. A method as in claim 7, further including the step of authenticating the modified packet by the receiving host.

13. A method as in claim 7, wherein the external network is the Internet.

14. A method as in claim 7, wherein the NAP is a firewall.

* * * * *